(12) United States Patent
Cuce' et al.

(10) Patent No.: US 12,545,370 B2
(45) Date of Patent: Feb. 10, 2026

(54) ANCHORING DEVICE (71) Applicant: SEARES S.R.L., Pisa (IT)

(72) Inventors: Giorgio Cuce', Leghorn (IT); Corrado Taviani, Fucecchio (IT); Alessandro Burchianti, Saline di Volterra (IT); Marco Bartalucci, Castelfranco di Sotto (IT); Nicola Sgambelluri, Pisa (IT)

(73) Assignee: SEARES S.R.L., Pisa (IT)

( * ) Notice: Subject to any disclaimer, the term of this patent is extended or adjusted under 35 U.S.C. 154(b) by 243 days.

(21) Appl. No.: 18/061,079

(22) Filed: Dec. 2, 2022

(65) Prior Publication Data

US 2023/0098826 A1 Mar. 30, 2023

Related U.S. Application Data

(63) Continuation-in-part of application No. 17/292,611, filed as application No. PCT/IB2019/059655 on Nov. 11, 2019, now Pat. No. 11,541,966.

(30) Foreign Application Priority Data

Nov. 12, 2018 (IT) .................. 102018000010258

(51) Int. Cl.
*B63B 21/22* (2006.01)
*F16F 15/00* (2006.01)
*B63B 21/00* (2006.01)

(52) U.S. Cl.
CPC ............ *B63B 21/22* (2013.01); *F16F 15/005* (2013.01); *B63B 2021/003* (2013.01);
(Continued)

(58) Field of Classification Search
CPC .............................. B63B 21/22; F16F 15/005
See application file for complete search history.

(56) References Cited

U.S. PATENT DOCUMENTS

| 4,454,800 A | 6/1984 | Koeepper et al. |
| 5,657,840 A | 8/1997 | Lizell |

(Continued)

FOREIGN PATENT DOCUMENTS

| DE | 102016225626 A1 | 6/2018 |
| EP | 0142996 A2 | 5/1985 |

(Continued)

OTHER PUBLICATIONS

The International Search Report and Written Opinion, mailed Mar. 6, 2020.

*Primary Examiner* — Vishal R Sahni
(74) *Attorney, Agent, or Firm* — Vorys, Sater, Seymour and Pease LLP; Anthony P. Venturino; Maryellen Feehery Hank (57) ABSTRACT

An anchoring device for anchoring a floating object to an anchor structure, including a first attachment for being constrained to the floating object; a second attachment for being constrained to the anchor structure; a damping member for damping the relative motion between the attachments for securing the first attachment to the second attachment and including a sliding chamber, a piston for sliding in the sliding chamber according to a relative motion between the attachments and a damper for damping the sliding of the piston in the sliding chamber; and a control unit including a measurement sensor for measuring the sliding of the piston; and a control board for varying the damping of the damper according to the sliding of the piston detected by the measurement sensor.

13 Claims, 3 Drawing Sheets

(52) U.S. Cl.
CPC ..... *F16F 2222/06* (2013.01); *F16F 2228/066* (2013.01); *F16F 2230/08* (2013.01); *F16F 2230/18* (2013.01); *F16F 2232/08* (2013.01)

(56) References Cited

U.S. PATENT DOCUMENTS

| | | | |
|---|---|---|---|
| 9,273,750 B2 * | 3/2016 | Cuce ................. | B63B 21/56 |
| 10,718,878 B2 * | 7/2020 | Torres Tamanaja ................. | |
| | | | G01V 1/3826 |
| 11,541,966 B2 * | 1/2023 | Cuce' ................ | F16F 15/03 |
| 2001/0029879 A1 * | 10/2001 | Cottrell ............. | B63B 22/02 |
| | | | 441/3 |
| 2011/0084503 A1 * | 4/2011 | Li ...................... | B60G 17/019 |
| | | | 290/1 R |
| 2014/0226439 A1 * | 8/2014 | Tenghamn ........ | B06B 1/0276 |
| | | | 367/15 |
| 2018/0001968 A1 * | 1/2018 | Perlman ............ | F16G 11/12 |
| 2019/0212461 A1 * | 7/2019 | Torres Tamanaja ..... | G01V 1/04 |
| 2023/0098826 A1 * | 3/2023 | Cuce' ................ | F16F 15/005 |
| | | | 114/293 |

FOREIGN PATENT DOCUMENTS

| | | | |
|---|---|---|---|
| EP | 2705272 A2 | | 3/2014 |
| JP | 2000018304 A | * | 1/2000 |
| JP | 2009243651 A | | 10/2009 |
| WO | 9902889 A1 | | 1/1999 |
| WO | 2012156854 A2 | | 11/2012 |

* cited by examiner

ANCHORING DEVICE

FIELD OF THE INVENTION

This invention relates to an anchoring device.

In particular, the invention relates to a device suitable for securing a floating object (such as a boat or a buoy) to an anchor structure that can be floating or integral to the ground. The anchoring device can thus be used to, for example, constrained a boat to a floating or fixed dock. It should be noted that for simplicity and clarity, the expression "anchoring device" also identifies a mooring device.

BACKGROUND OF THE INVENTION

As is well known, in order to secure a boat or other floating object, avoiding unwanted movements with respect to a certain structure, it is possible to carry out anchoring operations, wherein anchors are used, or mooring/docking operations involving tying ropes to bitts.

Often, in order to give greater stability to the anchored structure, a mooring spring (also called a spring or compensator) is used. This consists of an elastic body that is fixed to a boat by means of a rope or chain and it protects the mooring from wave motion, guaranteeing greater comfort on board.

The mooring spring can be made of various materials, such as steel, rubber, or thermoplastic material.

The prior art described here comprises a few important drawbacks.

In particular, the anchoring devices, i.e. ropes and mooring springs, are difficult to adjust and, therefore, if not well held, they can enable the floating object to move considerably relatively to the anchor structure and may, therefore, cause damage to the floating object and/or the anchor structure.

In addition, the well-known anchoring devices have constant stiffness and damping features that often vary with weather conditions, aging, corrosion, etc.

SUMMARY OF THE INVENTION

In this context, the technical task underlying this invention is to devise an anchoring device capable of substantially overcoming at least some of the above-mentioned drawbacks.

As part of said technical task an important purpose of the invention is to obtain an anchoring device that is easy to adjust and that, therefore, enables the accurate anchoring of the floating object to the anchor structure.

The technical task and the specified purposes are achieved by means of an anchoring device as claimed. Examples of preferred embodiments are described in the claims.

BRIEF DESCRIPTION OF THE DRAWINGS

The characteristics and advantages of the invention are clarified by the following detailed description of preferred embodiments thereof, with reference to the accompanying drawings, wherein:

the FIG. 1 shows, in scale, an anchoring device according to the invention;

the FIG. 2 shows, in scale, a cross-section of FIG. 1;

the FIG. 3 shows, in scale, an assembly of the anchoring device; and the FIG. 4 shows a second assembly of the anchoring device;

the FIG. 5 illustrates a graph showing the development over time of an operating characteristic of the anchoring device.

DETAILED DESCRIPTION OF THE PREFERRED EMBODIMENTS

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

The measurements and data reported in this text are to be considered, unless otherwise indicated, as performed in the International Standard Atmosphere ICAO (ISO 2533).

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

With reference to the figures, the number 1 indicates, as a whole, the anchoring device according to the invention.

It is suitable for constraining a floating object (such as a boat or a buoy) to an anchor structure (floating or integral to the ground) allowing a relative motion between the floating object and the anchor structure.

The anchoring device 1 comprises a first attachment 2 suitable for being secured to the floating object; and a second attachment 3 suitable for being secured to the anchor structure.

It is noted that the movement of the waves commands a variation in distance between the connections and to be precise a relative motion between connections 2 and 3 that is appropriately oscillatory (amplitude and frequency of the motion are variable as a function of the wave).

The first attachment 2 can be secured to the floating object by means of ropes or other suitable connection means, such as chains, metal cables, rods, or shackles (hereinafter called, collectively, ropes). Alternatively, it can be secured to the floating object.

The second attachment 3 can be secured to the anchor structure by means of ropes. Alternatively, it can be firmly secured to the anchor structure.

Said attachments 2 and 3 define fastenings that can be done and undone.

The anchoring device 1 comprises a damping member 4 for the relative motion between the attachments 2 and 3 and, therefore, between the floating object and the anchor structure.

The damping member 4 is configured to allow said relative motion between said ports 2 and 3 by defining a sliding axis 4a between said ports 2 and 3. In particular, it is configured to vary its length along said axis 4a allowing said variation of distance between said ports 2 and 3 and thus said suitably oscillatory motion between said ports 2 and 3.

The damping member 4 comprises a sliding chamber 41 defining a sliding axis 4a; a piston 42 suitable for sliding, along said axis 4a, in the sliding chamber 41 according to a relative motion between the attachments 2 and 3; and at least one damper 43 suitable for damping the sliding of the piston 42 in the sliding chamber 41.

The piston 42 is attached to one of attachments 2 or 3, in particular, to the first attachment 2.

The motion of piston 42 can be oscillatory appropriately with proportional amplitude and frequency, and in particular substantially equal to the motion between connections 2 and 3 and thus of the wave.

The sliding chamber 41 is attached to an attachment 2 or 3 that is separate from that of the piston 42, and preferably to the second attachment 3.

The sliding chamber 41 can define a watertight internal volume. The piston 41 has its head inside the internal volume and the stem partially protruding from it through a hole equipped with sealing means.

The sliding of the piston 42 and, therefore, the position of the piston 42 defines a contracted configuration for the damping member 4, wherein the distance between the attachments 2 and 3 is minimum, and an expanded configuration, wherein the distance between the attachments 2 and 3 is maximum.

The damping member 4 may, conveniently, comprise elastic means 44 suitable for working in opposition to a variation in the distance between the attachments 2 and 3 and, in particular, to a transition from the contracted to the expanded configuration. The damping member 4 may comprise at least one kinematic mechanism 45 suitable for kinematically connecting the piston 42 and damper 43. The member 4 conveniently comprises a kinematic mechanism for the damper 43.

The kinematic mechanism 45 is a gearing suitable for transforming the rectilinear motion of the piston 42 into a rotary motion at the damper 43.

The kinematic mechanism 45 can be conveniently fixed in relation to the transmission.

It may comprise a rack 45a extending along the sliding axis 4a; and a toothed wheel 45b suitable for sliding along the rack 45a.

The rack 45a can be attached to the piston 42.

It should be obvious, for a person skilled in the art, how to replace the rack with a worm screw or a ball screw.

The toothed wheel 45b can be attached to the sliding chamber 41 and can be controlled in rotation by the rack 45a.

The kinematic mechanism 45 can comprise a multiplier 45c suitable for multiplying the rotation speed of the rotor, enabling the transition from low speeds, typical of a wave, to a higher speed motion.

Preferably, the damping member 4 comprises at least one electric damper 43. Said damper 43 is identifiable in an electric motor comprising a rotor 43a and a stator 43b and capable of dissipating energy by opposing a reciprocal rotation between stator 43b and rotor 43a. Specifically, it is 43 a brushless electric motor.

It should be noted that said electric motor, i.e. the damper 43, can be used to produce energy by exploiting the sliding of the piston 42.

The damper 43 is attached to the chamber 41.

The damping member 4 conveniently comprises several dampers 43 that can be controlled by said at least one toothed wheel 45b. More conveniently, the damping member 4 comprises several dampers 43 each of which can be controlled by a toothed wheel 45b; and, in particular, three dampers 43 and three toothed wheels 45b, each of which actuates a damper 43.

An example of a damping member 4 and, in particular, of the anchoring device 1 is described in EP2705272 in paragraphs, included for reference, [0015]-[0108] and in FIGS. 1-18, included for reference.

The anchoring device 1 may comprise at least one electrical energy converter 5.

The converter 5 is suitable for varying the parameters of the electricity output from the damper 43 allowing the use of an external device and/or the same device 1.

At least one converter 5 is located in said internal volume.

The anchoring device 1 may comprise at least one energy storage battery 6 for the output from the converter 5 and/or the damper 43.

The battery 6 is located in said internal volume.

Optionally, the anchoring device 1 can comprise 7 connectors suitable for allowing the electrical connection of an external unit to the device.

The connectors are external to the volume and in electrical connection with the battery 6 and/or the converter 5.

The anchoring device 1 may comprise a control unit 8 for the operation of the same device 1.

The control unit 8 may comprise at least one measurement sensor 81 for measuring the sliding of the piston 42 and thus of said motion between attachments 2 and 3.

In particular, the at least one measurement sensor 81 is suitable for measuring at least one of the following: speed (in module and, conveniently, towards) and acceleration (in module and, conveniently, towards) of the sliding of the piston 42. More specifically, the sensor is suitable for measuring speed and acceleration.

Preferably the at least one measurement sensor 81 is capable of detecting one or more of the characteristics of the oscillatory motion of the piston 42. More in detail it is capable of detecting at least one of velocity (in modulus and suitably direction), acceleration (in modulus and suitably direction) and amplitude of the oscillatory motion. More in detail, the sensor 81 is capable of detecting speed, acceleration and amplitude of the oscillatory motion of the piston 42.

It can be seen that the detection of the characteristics is performed during the motion either in a continuous manner or in a discrete manner with relatively reduced intervals (e.g. every second).

In this document the word "characteristics" comprises at least one of velocity, acceleration and amplitude of the oscillatory motion and the damping of the damper 43. In detail, it comprises velocity, acceleration and amplitude of the oscillatory motion and said damping.

At least one measurement sensor 81 may be suitable for measuring the sliding of the piston 42 in a direct manner. It can thus carry out a direct measurement of the sliding of the piston 42 by measuring its movement and/or position (e.g. a variation in position) along the sliding axis 4a. The at least one measurement sensor 81 can measure the rotation of the toothed wheel 45b and/or a variation in distance between the piston head 42 and a base of the sliding chamber 41.

The unit conveniently has a sensor 81 for each toothed wheel 45b.

As an alternative or addition, the at least one measurement sensor 81 can carry out an indirect measurement of the sliding of the piston 42 by measuring the operating parameters of the damper 43. For example, the at least one measurement sensor 81 can measure the rotation speed of the rotor of the damper 43.

The control unit 8 may comprise a control board 82 of the anchoring device 1.

The control board 82 is in data connection with the damper 43 and, conveniently, with the converter 5 and/or battery 6 so as to monitor the production and status of the electrical energy.

The control board 82 is in data connection with the one or more sensors present in the device 1. In particular, the control board 82 is in data connection with the measurement sensor 81 which then sends to said board 82 the measurement of the sliding of the piston 42 and therefore of the motion between the attachments 2 and 3. Accordingly, the control card 82 knows, suitably in real time, the position, speed and acceleration of the piston 42 and in detail the module, and direction along the axis 4a of the speed and acceleration of the piston 42. It can thus know, suitably in real time, the characteristics of the oscillatory motion of the piston 42 (therefore of the attachments 2 and 3 and consequently of the wave) and therefore the amplitude and frequency of said oscillatory motion.

The control card 82 can be adapted to vary (i.e. command a variation) the damping of the damper 43 according to the sliding of the piston 42 detected by the measurement sensor 81 and, to be precise, according to the characteristics of the oscillatory motion of the piston 42 (i.e. of the motion of the connections 2 and 3 and consequently of the wave).

In detail, the control board 82 varies the damping of the damper 43 according to speed and/or acceleration of the piston 42. More in detail, the control board 82 varies the damping of the damper 43 in accordance, preferably proportionally, with speed and/or acceleration of the piston 42. Accordingly, the card 82 controls the sliding of the piston 42 retroactively.

It should be noted that in this document the expression "based on" identifies that a variation and, for example, an increase of a first parameter (in this case, the sliding speed of the piston 42) corresponds to any variation (increase or decrease) of the second parameter (in this case, the damping); the expression "in accordance with" identifies that an increase or decrease of a first parameter corresponds, respectively, to an increase or decrease of the second parameter.

Alternatively or additionally, the control board 82 may be adapted to vary the damping of the damper 43 in a predictive manner. In particular, the board 82 may comprise a historical database and vary the damping of the damper 43 based on said historical database and the current oscillatory motion of the piston 42.

The expression "current oscillatory motion" identifies the motion measured in real time by the measurement sensor 81. It may comprise one or more oscillatory motions.

The historical database may comprise one or more sequences of oscillatory motions of the piston 42 and thus of the couplings 2 and 3; with each of said sequences being associated for each oscillatory motion at least one characteristic of the oscillatory motion and in particular amplitude and acceleration and/or velocity of the piston 42.

The expression "sequence of oscillatory motions" thus identifies a succession of two or more oscillatory events of the piston 42 i.e. motions in which the piston 42 performs at least a significant part (suitably the entirety) of the stroke in each of the two directions. Preferably, the expression "sequence of oscillatory motions" identifies a succession, preferably without interruption, of oscillatory motions detected over a predefined period of time (e.g. 12 hours or a day).

Additionally or alternatively, in the historical database each sequence may be associated with at least one variation function of one or more of the characteristics of the oscillatory motion of the piston 42 describing how that characteristic varies during each motion and thus during the sequence. Preferably, a variation function of each characteristic of the oscillatory motion of the piston 42 is associated with each sequence in the historical database. Therefore, the board 82 is able to identify for each sequence the trend of the motion of the piston 42 and consequently identify how during a sequence of oscillatory motions one or more of the characteristics of the motion of the piston 42 varies by defining a variation function of each characteristic of the oscillatory motion of the piston 42.

Thanks to such a historical database, the control board 82 can identify in the historical database the sequence of oscillatory motions close to what was detected by the measurement sensor 81, define a prediction of future oscillatory motions and adapt the damping of the piston 42 to said prediction. In detail, the control board 82 defines a variation function of the current oscillatory motion of the piston 42; compares said function with at least a portion (preferably initial) of the variation functions of the sequences in the historical database thus identifying the variation function closest to the variation function of the current oscillatory motion; performs the prediction by determining in accordance with the variation function identified in the historical database at least one characteristic of the future oscillatory motions of the piston 42; varies the damping of the damper 43 in accordance with said prediction.

Figure 1:
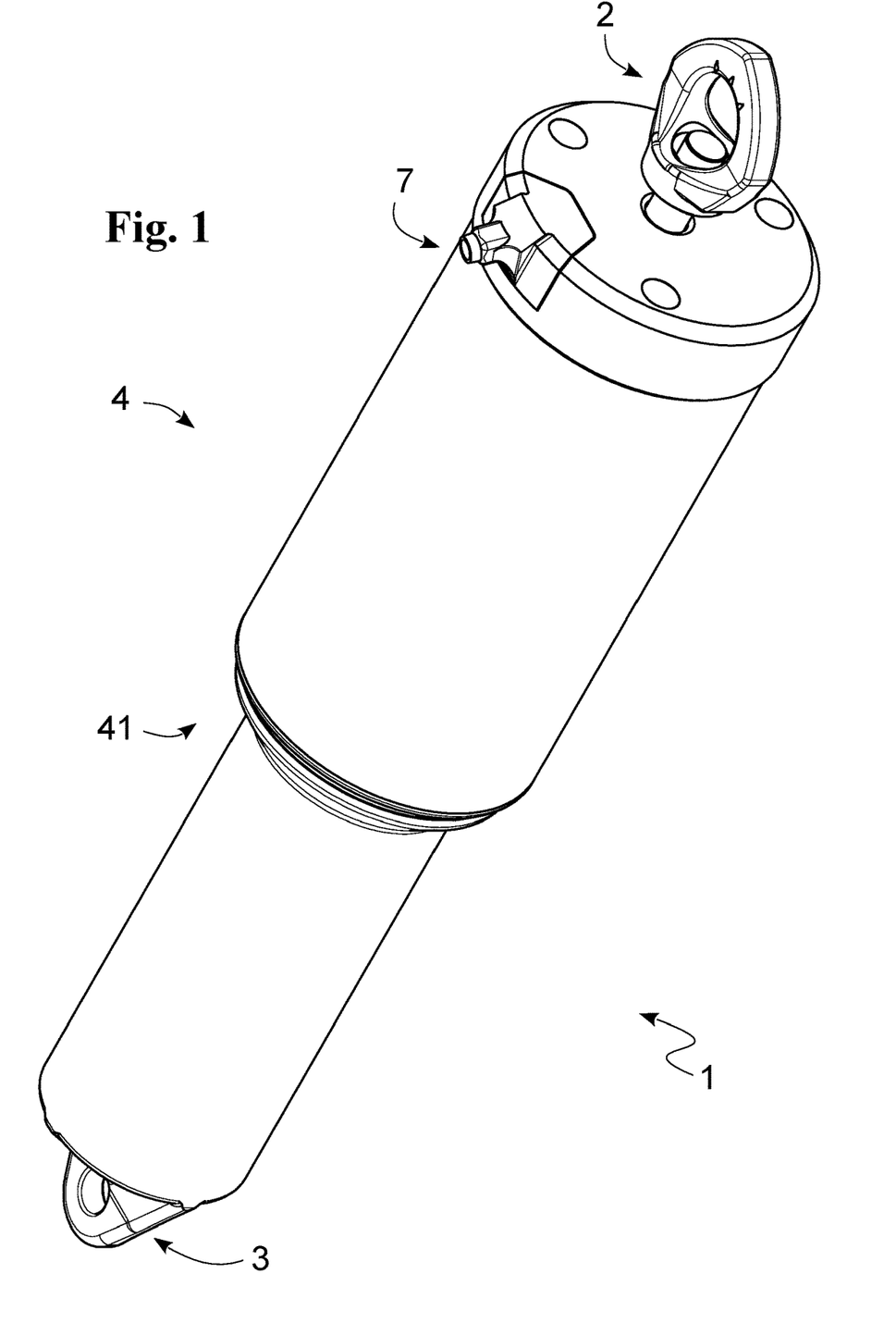
Figure 2:
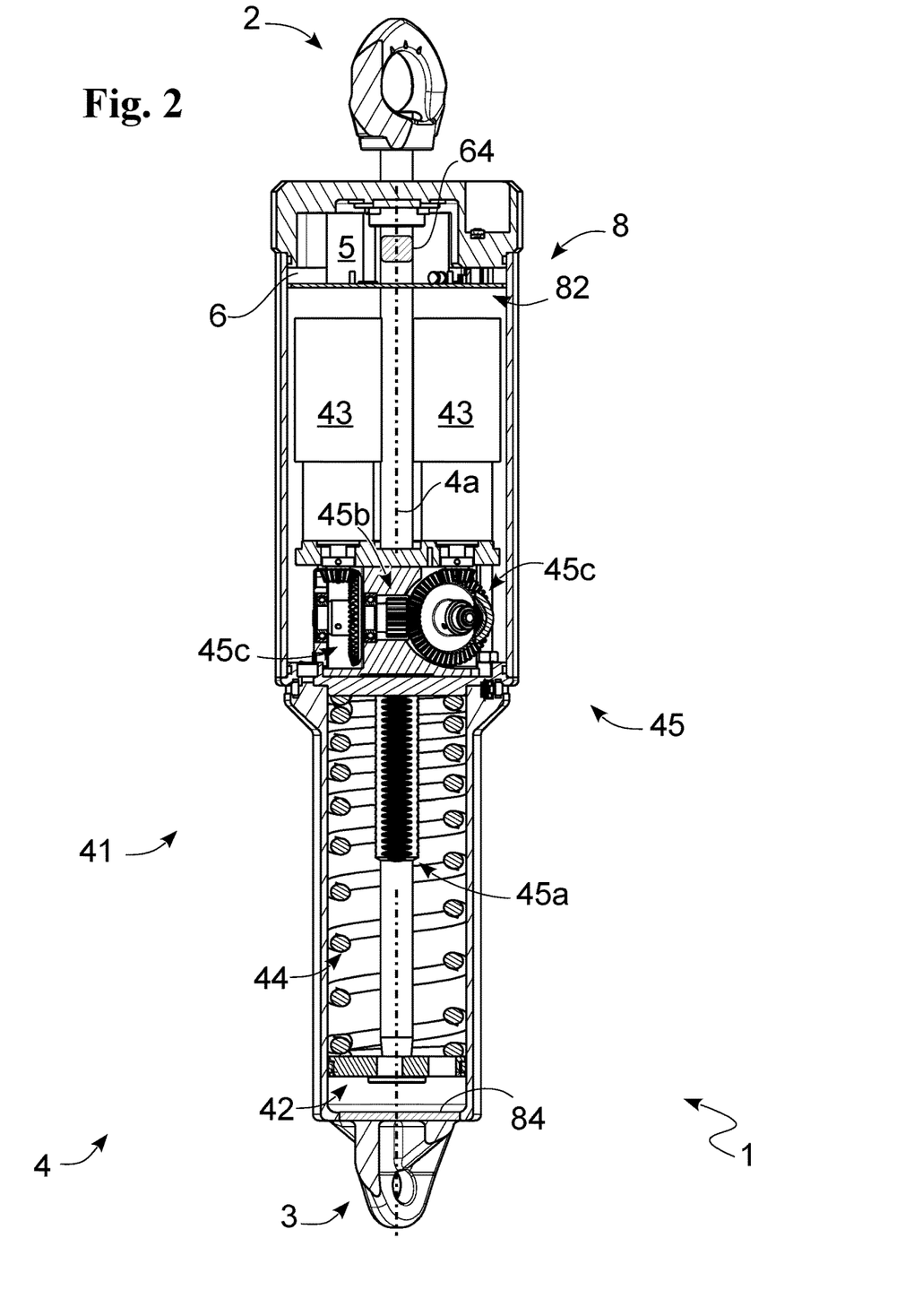
Figures 3, 4, 5:
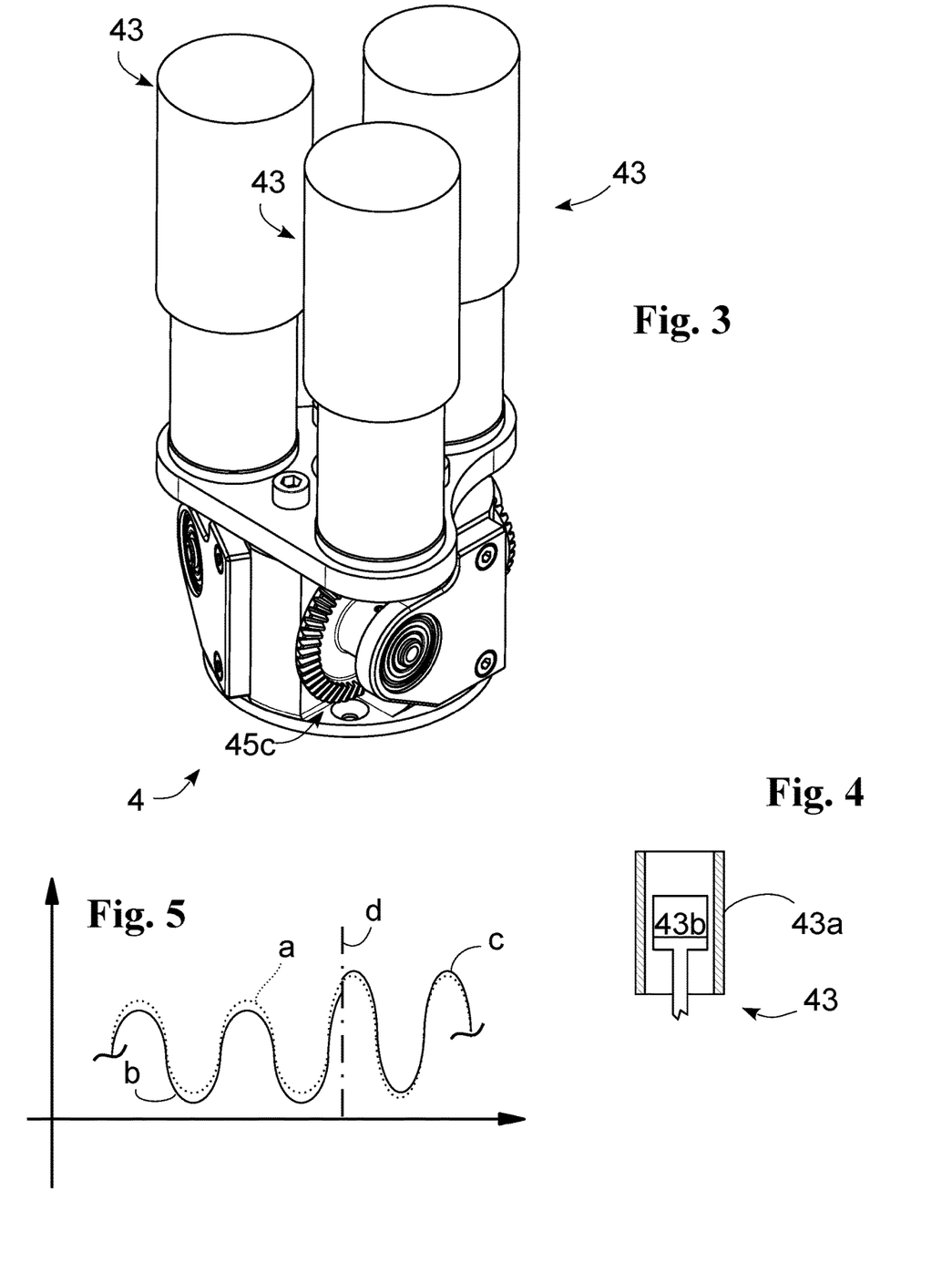

Future oscillatory motions identify the oscillatory motions which, according to the identified sequence, follow the current oscillatory motion measured in real time by the sensor 81 and which will therefore be executed by the piston 42 according to the board 82. In order to clarify this concept, FIG. 5 is shown where, for a characteristic, the line (a) represents, in the time, the variation function of one characteristic according to a sequence of the historical database, the line (b) represents the function resulting from the current oscillatory motion, the line (c) represents the function describing future oscillatory motions; and the line (d) identifies the time of the prediction.

The board 82 identifies among the functions in the historical database as a 'function close to the function of the current oscillatory motion' the function having a trend with minimal differences from the other functions in the historical database; and/or having a trend with deviation less than an acceptability threshold (i.e. with values of the characteristics/damping that differ at each point/instant by less than this threshold). The acceptability threshold can be as low as 1% and for accuracy as high as 1% of the corresponding characteristic in the sequence of oscillatory motions.

Optionally, the historical database may additionally associate with each sequence of oscillatory motions the damping of the damper 43 and in particular the damping function i.e. the function describing the damping commanded by the control board 82 to the damper 43 during said sequence and thus how the damping varies during each oscillatory motion of the sequence. Accordingly, the control board 82 depending on what is detected by the measurement sensor 81 can identify in the historical database the sequence of oscillatory motions close to what is detected by the measurement sensor 81 and thus command the damping of the damper 43 in accordance with the damping function of the identified sequence.

It is noted that in some cases the control board 82, not identifying a sequence close to the current oscillatory motion, can control the damping of the damper 43 according to a damping function of a new sequence of oscillatory motions. This new sequence is obtained by board 82, based on statistical calculations, by implementing with each other a plurality of sequences from the historical database so that the new sequence is close to the current oscillatory motion detected by the sensor 81.

The historical database can be pre-stored on the control board 82. Alternatively or additionally it may be realised/updated by the control board 82 storing the characteristics of the oscillatory motions of one or more sequences detected by the measurement sensor 81 in said predefined time frame.

The control board 82 varies the damping of the damper 43 by changing the magnetic parameters of the poles at the stator and/or rotor so as to vary the opposition to the rotation of the rotor. More specifically, the board controls 82 variations in parameters such as polarity, magnetic intensity, and electrical load circuit mode.

The control board 82 is suitable for maintaining the sliding speed of the piston 42 between a minimum speed and a maximum speed. Therefore, if, for example, the sliding speed of the piston 42 is greater than the maximum speed, the control board 82 controls an increase in damping and, therefore, the damper 43 more strongly opposes the sliding of the piston 42 which slows down.

The minimum speed is substantially less than 0.06 m/s and, more specifically, substantially between 0.06 m/s and 0.01 m/s and, preferably, between 0.05 m/s and 0.03 m/s. It is, conveniently, substantially equal to at least 0.04 m/s.

The maximum speed is substantially greater than 0.04 m/s and, more specifically, substantially between 0.1 m/s and 0.04 m/s and, preferably, between 0.07 m/s and 0.05 m/s. It is, conveniently, substantially equal to at least 0.06 m/s.

The control unit 8 may comprise at least one first force sensor 83 suitable for measuring the force that the floating object applies to the first attachment 2.

The control board 82 can, therefore, based on a variation in force at said first sensor 83, measure variations in external load (for example, due to a wave or wind) on the floating object.

The control unit 8 may comprise at least one second force sensor 84 suitable for measuring the force applied by the anchor structure to the second attachment 3.

In the same way, the control board 82 can, therefore, based on a variation of force at said second sensor 84, measure variations in the external load on the anchor structure due, for example, to movements of the floating object with respect to the anchor structure.

The control board 82 can vary the damping of the damper 43 based on and preferably in accordance with, preferably proportionally to, said measurements of the one or more force sensors 83 and 84.

The control unit 8 may comprise a monitoring system for the damper 43 suitable for measuring the parameters of the damper's 43 operation.

The monitoring system may be suitable for measuring the temperature of the damper 43.

The monitoring system may be suitable for measuring the electrical current parameters (such as amperage and/or voltage) at the output of the damper 43.

The control unit 8 may comprise at least one environmental sensor set, in data connection with the control board 82, suitable for measuring environmental parameters external to the anchoring device 1.

The control unit 8 may comprise a first wave motion characterization sensor set. Said first sensor set may comprise one or more first environmental sensors, each of which is suitable for identifying the characteristics of the waves, such as the modulus and direction of the current, the height and frequency of the waves.

Based on the data collected by said first sensor set, the control board 82 may vary the damping of the damper 43. The control board 82 preferably varies the damping of the damper 43 in accordance with, preferably proportionally to, the data collected by the first sensor set.

The control unit 8 may comprise a second sensor set for characterising the water conditions. Said second sensor set may comprise one or more second environmental sensors, each of which is suitable for measuring at least one water parameter that can be chosen from: temperature, clarity, presence of pollutants in the water, salinity, depth, and presence of fish.

The control unit 8 may comprise a third air characterization sensor set. Said third sensor set may comprise one or more third environmental sensors, each of which is suitable for measuring one or more air parameters such as temperature, exposure to light, presence of pollutants in the air, modulus and wind direction.

It should be noted that the various sensors of said sensor sets are known in and of themselves.

Finally, the control unit 8 may comprise a distance gauge. More specifically, the control unit 8 may comprise a first distance gauge for gauging the distance between the anchoring device 1 and the floating object; and a second distance gauge for gauging the distance between the anchoring device 1 and the anchor structure.

The control unit 8 may comprise a geo-localiser suitable for identifying the position of the anchoring device 1.

The anchoring device 1 may comprise data connection means suitable for allowing a data exchange, preferably a wireless one (using WI-FI, Bluetooth and LoRa), between the control unit 8 and an external unit suitable for monitoring, thanks to the reception of the parameters collected by the control unit 8, the operation of the device 1.

The operation of the anchoring device 1 described above in a structural sense, is as follows.

To begin with, the anchoring device 1 is secured, through the first attachment 2, to the floating object (e.g. a boat or a vessel) and, through the second attachment 3, to an anchor structure.

When, due to the wave motion, there is a relative motion between the floating object and the anchor structure that, by moving the attachments 2 and 3 together, causes a sliding of the piston 42 along the sliding axis 4a, then, the damper 43 is actuated to attenuate the motion between the floating object and the anchor structure.

More specifically, the motion of the piston 42 causes the rack 45a to slide, resulting in a rotation of the toothed wheel 45b that, through a kinematic connection mechanism, activates the damper 43, causing the rotor to rotate.

This rotation of the rotor 43a, due to the poles present on the stator 43b, results in both a slowing down of the sliding of the piston, attenuating the motion between the floating object and the anchor structure, and a production of electrical energy that can be used to operate the device 1 and/or to supply an external device.

Where the control board 82, thanks to the measurement sensor 81, measures the speed of the piston 42 as higher than the maximum speed or lower than the minimum speed, the same control board 82 controls, respectively, an increase or a decrease of the damping of the damper 43 bringing the speed of the piston 42 within the desired range.

It is pointed out that the control board 82 can provide for storing in the historical database a new sequence of the oscillatory motions where for said predefined time frame the board 82 does not identify any upcoming unction because the current oscillatory motion has characteristics (acceleration and/or speed of the piston 42 and preferably damping) different from those of the oscillatory motions of the sequences present in the historical database.

The invention introduces an innovative procedure for controlling the damping of a previously described anchor system 1.

The procedure comprises a step of measuring the current oscillatory motion of the piston 42. In this step, the measurement sensor 81 detects at least one of the characteristics of the oscillatory motion of the piston 42 and in particular detects at least one of velocity (in modulus and suitably towards), acceleration (in modulus and suitably towards) and amplitude of the oscillatory motion. In more detail, the sensor 81 detects amplitude and velocity and/or acceleration.

The procedure comprises a prediction phase in which the control board 82 identifies in the historical database the sequence of oscillatory motion close to that detected by the measurement sensor 81 and performs the prediction of future oscillatory motions in accordance with the identified sequence. In fact, the control board 82, by performing this identification, is able to identify at what point (i.e. at what instant) of the sequence of oscillatory motions the characteristic detected in real time by the sensor 81 is located, thus allowing to perform the prediction assuming that the subsequent oscillatory motions will be similar/similar to those described in the identified sequence subsequent to the point thus identified.

In particular, in the prediction phase the control board 82
a) defines a variation function of the current oscillatory motion of the piston 42 appropriately in accordance with what is detected by the sensor 81;
b) searches the historical database for the sequence of oscillatory motions having a variation function which is closest (preferably almost equal) to the variation function of the current oscillatory motion. In particular, it searches the database for the sequence of oscillatory motions by comparing the variation function of the current oscillatory motion with a portion (preferably initial) of the functions in the historical database;
c) performs the prediction by determining at least one characteristic of the future oscillatory motions of the piston 42 in accordance with the variation function identified in the historical database; optionally the control board 82 performs the prediction in accordance with the damping function associated with the identified sequence.

The process comprises a damping variation step in which the control board 82 commands the damper 43 to vary the damping preferably by modifying the magnetic parameters of the poles at the stator 43b and/or rotor 43a so as to vary the opposition to rotation of the rotor.

Appropriately, the control board 82 varies the damping of the damper 43 of the piston 42 in accordance with said prediction performed in the prediction step and in particular the damping function associated with the identified sequence.

The procedure may comprise an updating phase in which the control board 82 stores the current oscillatory motion in the historical database as a new sequence of oscillatory motions wherein the board does not identify a sequence close to the current oscillatory motion the oscillatory motion which then, appropriately measured by the sensor 81 for said predefined time frame, has characteristics (acceleration and/or speed of the piston 42) different from those of the sequences of oscillatory motions present in the historical database.

The anchoring device 1 according to the invention achieves important advantages.

In fact, thanks to the measuring sensor 81 and, therefore, the control board 82, it is able to monitor the operation of the damper 43. In particular, the anchoring device 1, by acting on the damping, is able to vary the sliding speed of the piston 42 and, consequently, to have a basic adaptive behaviour based on the sea conditions.

In fact, by varying the sliding speed of the piston 42 based on the sliding of the piston 42 and, therefore, based on the wave motion, the device can easily adapt the speed of the damper (i.e. of the rotor) keeping it within a range of maximum efficiency of electricity production.

In addition, this capacity allows the anchoring device 1 to smoothly oscillate regardless of the state of the sea and wind.

It should be noted that this aspect is further accentuated by the presence of force sensors 83 and 84 that, by providing additional information to the control board 2, allow a more optimal control of the anchoring device 1 and, therefore, of its oscillations.

One advantage owes to the presence of the data connection means that, by sending the data collected by the control unit 8 to an external unit, allow to remotely monitor the operation of the anchoring device 1 (allowing, for example, a preventive maintenance) and/or allow to know, for example, the presence and status of a floating object anchored to the device 1 or a trend history of the wave motion, the state of the sea, etc.

Another advantage is represented by the fact that, since the wave has relatively slow frequencies, it causes slow oscillatory motions of the piston 42 with respect to the frequency of the board 82 which can therefore continuously monitor the trend by adapting and varying the damping of the damper 43 also several times during a single stroke of piston 42.

The invention is subject to variations falling within the scope of the inventive concept defined by the claims. In this context all the details may be replaced with equivalent elements and the materials, shapes and dimensions may be as desired.

The invention claimed is:

1. An anchoring device for anchoring a floating object to an anchor structure comprising:
   a first attachment suitable for being secured to said floating object;
   a second attachment suitable for being secured to said anchor structure;
   a damping member of the relative motion between said attachments and suitable for securing said first attachment to said second attachment and comprising
      a sliding chamber,
      a piston suitable for sliding in said sliding chamber according to a relative motion between said attachments defining an oscillatory motion; and
      at least one electric damper suitable for damping the sliding of said piston in said sliding chamber and wherein said electric damper is electrically driven and comprises a rotor and a stator and capable of dissipating energy by opposing a reciprocal rotation between the stator and the rotor;
a kinematic mechanism kinematically connecting the piston and electric damper and transforming the rectilinear motion of the piston into a rotary motion at the electric damper; and
comprising a control unit for said anchoring device comprising:
a measurement sensor of said sliding of said piston detecting at least one characteristic of said oscillatory motion of said piston; said at least one characteristic of said oscillatory motion comprising at least one of velocity, acceleration and amplitude of said oscillatory motion;
a historical database comprising a plurality of sequences of said oscillatory motions of said piston; each of said sequences being associated with said at least one characteristic of each of said oscillatory motions of said sequence and with the damping of the electric damper;
a control board capable of:
identifying in said historical database the next sequence of oscillatory motions having said at least one characteristic close to said at least one characteristic of said oscillatory motion detected by said measuring sensor; and
predictively varying the damping of said electric damper as a function of said identified sequence of oscillatory motions; and
wherein the control board varies the damping of said electric damper by modifying the magnetic parameters of poles at the stator and/or the rotor so as to vary the opposition to the rotation of the rotor.

2. The anchoring device according to claim 1, wherein in said historical database each of said sequences of said oscillatory motions of said piston is associated with at least one variation function of at least one of said characteristics; and wherein said control board predictively varies the damping of said electric damper as a function of said variation function.

3. The anchoring device according to claim 2, wherein said control board identifies in said historical database the sequence of said oscillatory motions having characteristics close to the characteristics detected by said measurement sensor and thereby predictively varies the damping of said electric damper as a function of said variation function associated with said identified sequence of said oscillatory motions.

4. The anchoring device according to claim 1, wherein in said historical database each of said sequences of said oscillatory motions of said piston is associated with at least one damping function of said electric damper; and wherein said control board predictively varies the damping of said electric damper according to said damping function.

5. The anchoring device according to claim 4, wherein said control board identifies in said historical database the sequence of said oscillatory motions having characteristics close to the characteristics detected by said measurement sensor and thereby predictively varies the damping of said electric damper according to said damping function associated with said identified sequence of said oscillatory motions.

6. The anchoring device according to claim 3, wherein in said historical database each of said sequences of said oscillatory motions of said piston is associated with at least one damping function of said electric damper; and wherein said control board predictively varies the damping of said electric damper according to said damping function.

7. The anchoring device according to claim 6, wherein said control board identifies in said historical database the sequence of said oscillatory motions having characteristics close to the characteristics detected by said measurement sensor and thereby predictively varies the damping of said damper according to said damping function associated with said identified sequence of said oscillatory motions.

8. The anchoring device according to claim 1, wherein the sliding chamber defines a watertight internal volume and therein the electric damper, the kinematic mechanism and the measurement sensor are integrally located in said internal volume.

9. A damping control procedure process of an anchoring system;
said anchoring system comprising:
a first attachment capable of being attached to said floating object
a second attachment capable of being constrained to said anchoring structure;
a damping element for damping relative motion between said attachments capable of binding said first attachment to said second attachment and comprising:
a sliding chamber
a piston sliding in said sliding chamber according to a relative motion between said ports defining an oscillatory motion; and
at least one electric damper suitable for damping the sliding of said piston in said sliding chamber and wherein said electric damper is electrically driven and comprises a rotor and a stator and capable of dissipating energy by opposing a reciprocal rotation between the stator and the rotor;
a kinematic mechanism kinematically connecting the piston and electric damper and transforming the rectilinear motion of the piston into a rotary motion at the electric damper; and
wherein said anchoring system comprises a control unit, said control unit of said anchoring system comprising:
a measurement sensor of said sliding of said piston detecting at least one characteristic of said oscillatory motion of said piston; said at least one characteristic of said oscillatory motion comprising at least one of speed, acceleration and amplitude of said oscillatory motion;
a historical database comprising a plurality of sequences of said oscillatory motions of said piston; each of said sequences being associated with at least one characteristic of each of said oscillatory motions of said sequence and with the damping of the electric damper;
a control board for predictively varying the damping of said electric damper according to said historical database,
said process comprising:
a measurement step in which said measurement sensor measures said at least one characteristic of a current oscillatory motion of said piston;
a prediction step, wherein said control board identifies in said historical database the next sequence of oscillatory motions having said at least one characteristic close to said at least one characteristic of said current oscillatory motion;
a damping variation step in which said control board commands said electric damper to vary said damping as a function of said sequence of oscillatory motions identified in said prediction step; and wherein the control board varies the damping of said electric damper by modifying the magnetic parameters of poles at the stator and/or the rotor so as to vary the opposition to the rotation of the rotor.

10. The process according to claim 9, wherein in said historical database each of said sequences of said oscillatory motions of said piston is associated with at least one variation function of at least one of said characteristics of said oscillatory motion; wherein said measuring step said control board defines a variation function of said current oscillatory motion as a function of said at least one characteristic of said current oscillatory motion of said piston; wherein said prediction step said control board identifies in said historical database the next sequence of oscillatory motions having said variation function to said variation function of said current oscillatory motion; and wherein in said variation step said control board varies the damping of said electric damper according to said variation function identified in said prediction step.

11. The process according to claim 9, wherein in said historical database each of said sequences of said oscillatory motions of said piston is associated with at least one damping function; and wherein in said control board variation step varies the damping of said electric damper according to said damping function of said sequence of oscillatory motions identified in said prediction step.

12. The process according to claim 10, wherein in said historical database each of said sequences of said oscillatory motions of said piston is associated with at least one damping function; and wherein in said control board variation step varies the damping of said electric damper according to said damping function of said sequence of oscillatory motions identified in said prediction step.

13. The anchoring device according to claim 9, wherein the sliding chamber defines a watertight internal volume and therein the electric damper, the kinematic mechanism and the measurement sensor are integrally located in said internal volume.

* * * * *